United States Patent
Pfeifenberger et al.

(10) Patent No.: US 12,374,318 B1
(45) Date of Patent: *Jul. 29, 2025

(54) SYSTEM AND METHOD FOR STYLE EXTRACTION IN SPEECH SYNTHESIS USING NEURAL NETWORKS AND STORED AUGMENTATIONS TO SIMULATE DEGRADED SPEECH CHARACTERISTICS

(71) Applicant: Sanas.ai Inc., Palo Alto, CA (US)

(72) Inventors: Lukas Pfeifenberger, Salzburg (AT); Shawn Zhang, Palo Alto, CA (US); Sharath Keshava Narayana, Palo Alto, CA (US)

(73) Assignee: SANAS.AI INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/783,676

(22) Filed: Jul. 25, 2024

Related U.S. Application Data (60) Provisional application No. 63/626,866, filed on Jan. 30, 2024.

(51) Int. Cl.
| | |
|---|---|
| G10L 13/033 | (2013.01) |
| G10L 13/08 | (2013.01) |
| G10L 15/02 | (2006.01) |
| G10L 25/90 | (2013.01) |
| H04M 9/08 | (2006.01) |

(52) U.S. Cl.
CPC .......... *G10L 13/0335* (2013.01); *G10L 25/90* (2013.01)

(58) Field of Classification Search
USPC .......................................... 704/232; 381/66
See application file for complete search history.

(56) References Cited

U.S. PATENT DOCUMENTS

| | | | | |
|---|---|---|---|---|
| 2014/0328490 | A1* | 11/2014 | Mohammad | H04M 9/082 381/66 |
| 2023/0197093 | A1* | 6/2023 | Morrison | G10L 15/02 704/232 |
| 2024/0005907 | A1* | 1/2024 | Golman | G10L 13/033 |

FOREIGN PATENT DOCUMENTS

| | | | | |
|---|---|---|---|---|
| CN | 116403563 A | * | 4/2023 | G10L 13/08 |

* cited by examiner

*Primary Examiner* — Farzad Kazeminezhad
(74) *Attorney, Agent, or Firm* — Troutman Pepper Locke LLP (57) ABSTRACT

The disclosed technology relates to methods, speech processing systems, and non-transitory computer readable media for style extraction in speech synthesis. In some examples, one or more content elements and one or more non-content elements are extracted from input audio data obtained via an audio interface and corresponding to input speech. The one or more non-content elements comprise style elements comprising at least an input pitch. A trained autoencoder is applied to encode the input pitch in a latent representation comprising a low-dimensional vector and combine the one or more content elements and the one or more non-content elements based on the low-dimensional vector to generate a new representation of the input speech. Output audio data is then generated and provided based on the new representation of the input speech. The output audio data comprises a pitch-consistent reconstruction of the input speech.

18 Claims, 5 Drawing Sheets

SYSTEM AND METHOD FOR STYLE EXTRACTION IN SPEECH SYNTHESIS USING NEURAL NETWORKS AND STORED AUGMENTATIONS TO SIMULATE DEGRADED SPEECH CHARACTERISTICS

This application claims priority to U.S. Provisional Patent Application Ser. No. 63/626,866, filed Jan. 30, 2024, which is hereby incorporated herein by reference in its entirety.

FIELD

This technology generally relates to audio analysis and, more particularly, to methods and systems for style extraction in speech synthesis using neural networks.

BACKGROUND

In the field of speech synthesis, extracting representations of a speech's audio characteristics, such as fundamental frequency (FO)/pitch, voicing state, and glottal closure instants, can be advantageous for incorporating them into modelling processes. One widely used technique for modelling pitch in speech synthesis is called pitch tracking.

Pitch tracking involves analyzing the speech signal to identify the fundamental frequency or pitch of the speaker's voice. This fundamental frequency represents the perceived pitch of the speech. By accurately tracking the pitch, it becomes possible to control the pitch of a synthetic voice and ensure it sounds natural and expressive.

Several algorithms can be employed for pitch tracking, with two commonly used methods being the autocorrelation method and the harmonic product spectrogram method. The autocorrelation method involves computing the autocorrelation function of the speech signal and finding the peaks that correspond to the pitch period. The harmonic product spectrogram method utilizes a spectrogram and identifies the periodicity in the speech signal to estimate the pitch.

Despite these techniques, pitch tracking in speech synthesis has been known to have limitations, particularly in noisy recording environments and online/streaming scenarios. The main challenge lies in the difficulty of accurately modelling pitch, including with machine learning systems. One of the primary reasons for this challenge is the lack of precise and reliable pitch annotations or labels available for training these systems.

Creating accurate pitch annotations for training data is a complex task, requiring manual or semi-automatic labelling by experts. Moreover, pitch is sensitive to various factors such as speaker characteristics, prosody, and phonetic context, making it challenging to develop a one-size-fits-all approach. These factors contribute to the unreliability and inaccuracy of pitch tracking, especially in real-world and dynamic speech settings.

Real-time and streaming applications pose additional challenges for traditional pitch tracking techniques. The inherent delays and computational constraints of traditional pitch tracking methods make them unsuitable for scenarios where timely and accurate pitch information is crucial. Furthermore, existing techniques often lack the flexibility to control and manipulate style-related elements, such as pitch, voicing, and emotion, limiting the customization of synthesized speech according to specific style requirements.

Thus, current speech synthesis systems are unable to effectively extract from input speech style-related information, particularly pitch, and provide inaccurate and unreliable results. Current speech synthesis technology is unable to address challenges posed by noisy environments and online/streaming use cases, where real-time and dynamic pitch estimation is crucial.

BRIEF DESCRIPTION OF THE DRAWINGS

The disclosed technology is illustrated by way of example and not limitation in the accompanying figures, in which like references indicate similar elements.

DETAILED DESCRIPTION

Examples described below may be used to provide a method, a device (e.g., non-transitory computer readable medium), an apparatus, and/or a system for style extraction in speech synthesis using neural networks. Although the technology has been described with reference to specific examples, various modifications may be made to these examples without departing from the broader spirit and scope of the various embodiments of the technology described and illustrated by way of the examples herein.

The disclosed technology includes a speech processing system 100 employing a deconstructor module 200, which includes a content extractor 400 and a neural network-based style extractor 402 with pitch-preservation capability, for receiving input speech 404 and separating it into content elements 406 and non-content elements 408. Specifically, the content elements 406 are extracted by the content extractor 400, while the neural network-based style extractor 402 captures the non-content elements 408, including style components or elements (e.g., pitch). A reconstructor module 202 combines the content elements 406 and style components of the non-content elements 408 output by the deconstructor module 200 to reconstruct the input speech 404 in a new representation of the input speech 412.

By preserving the pitch of the input speech 404 during the reconstruction, the disclosed technology facilitates retention of the natural pitch of a speaker's voice in the reconstructed output (i.e., the new representation of the input speech 412), and thereby enhances the authenticity and naturalness of that synthesized output. Thus, this technology improves authenticity and naturalness of the synthesized speech, improves speaker recognition, and maintains consistency in voice characteristics, such as timbre and speaking style, which ensures the speaker's identity is not changed. Accordingly, the speech processing system 100 of this technology advantageously provides enhanced and improved capabilities in speech analysis and synthesis.

Figure 1:
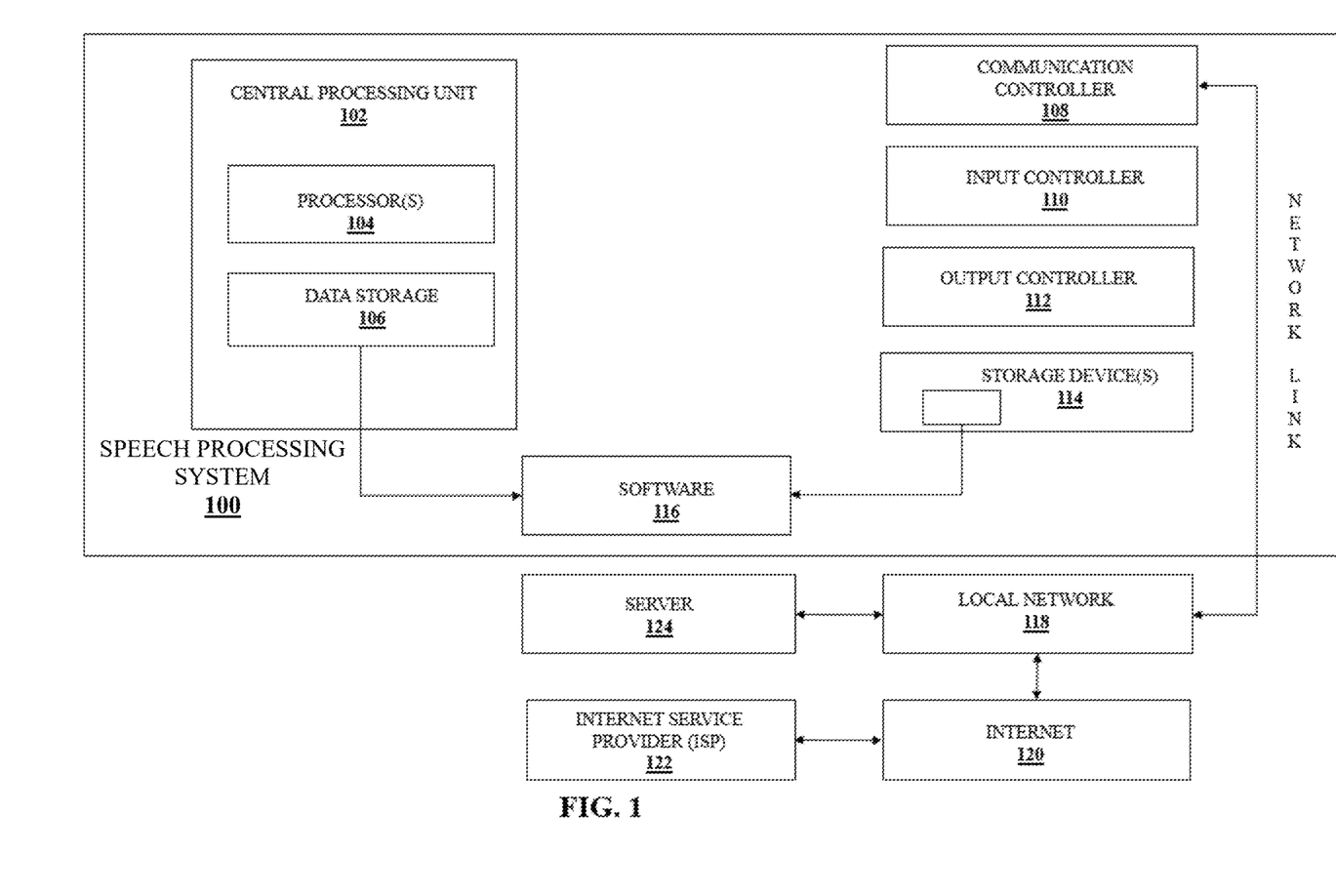
FIG. 1 is a block diagram of an exemplary network environment that includes a speech synthesis system.

Referring now to FIG. 1, a block diagram of an exemplary network environment that includes a speech processing system 100 is illustrated. The speech processing system 100 in this example is configured for style extraction in speech synthesis using neural networks and includes processor(s) 104, which are designed to process instructions (e.g., computer readable instructions (i.e., code)) stored on the storage device(s) 114 (e.g., a non-transitory computer readable medium) of the speech processing system 100. By processing the stored instructions, the processor(s) 104 may perform one or more of the steps and/or functions disclosed herein, such as with reference to FIGS. 3-5, for example.

The storage device(s) 114 may be optical storage device(s), magnetic storage device(s), solid-state storage device(s) (e.g., solid-state disks (SSDs)) or non-transitory storage device(s), another type of memory, and/or a combination thereof, for example, although other types of storage device(s) can also be used. The storage device(s) 114 may contain software 116, which is a set of instructions (i.e., program code). Alternatively, instructions may be stored in one or more remote storage devices, for example storage devices (e.g., hosted by a server 124) accessed over a local network 118 or the Internet 120 via an Internet Service Provider (ISP) 122.

The speech processing system 100 also includes an operating system and microinstruction code in some examples, one or both of which can be hosted by the storage device(s) 114. The various processes and functions described herein may either be part of the microinstruction code and/or program code (or a combination thereof), which is executed via the operating system. The speech processing system 100 also may have data storage 106, which along with the processor(s) 104 form a central processing unit (CPU) 102, an input controller 110, an output controller 112, and/or a communication controller 108. A bus (not shown) may operatively couple components of the speech processing system 100, including processor(s) 104, data storage 106, storage device(s) 114, input controller 110, output controller 112, and/or any other devices (e.g., a network controller or a sound controller).

The output controller 112 may be operatively coupled (e.g., via a wired or wireless connection) to a display device (e.g., a monitor, television, mobile device screen, touch-display, etc.) in such a fashion that the output controller 112 can transform the display on the display device (e.g., in response to the execution of module(s)). Input controller 110 may be operatively coupled (e.g., via a wired or wireless connection) to an input device (e.g., mouse, keyboard, touchpad scroll-ball, touch-display, etc.) in such a fashion that input can be received from a user of the speech processing system 100.

The communication controller 108 is coupled to the bus in some examples and provides a two-way coupling through a network link to the Internet 120 that is connected to a local network 118 and operated by the ISP 122, which provides data communication services to the Internet 120. The network link typically provides data communication through one or more networks to other data devices. For example, a network link may provide a connection through local network 118 to a host computer and/or to data equipment operated by the ISP 122. A server 124 may transmit requested code for an application through the Internet 120, ISP 122, local network 118, and/or communication controller 108.

The speech processing system 100 is illustrated in FIG. 1 with all components as separate devices for ease of identification only. One or more of the components of the speech processing system 100 in other examples may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). The speech processing system 100 also may be one or more servers, for example a farm of networked or distributed servers, a clustered server environment, or a cloud network of computing devices. Other network topologies can also be used in other examples.

Figure 2:
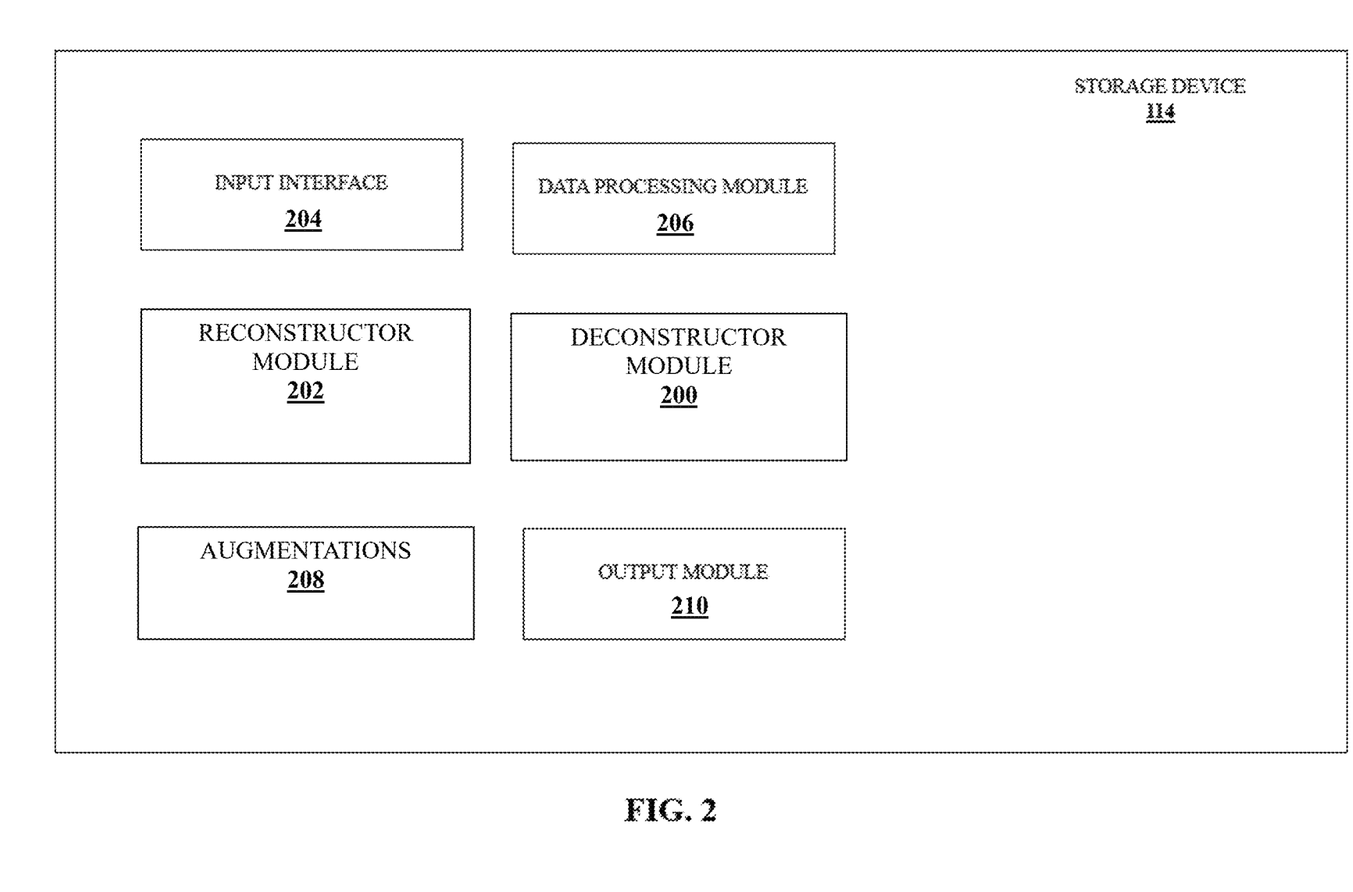
FIG. 2 is a block diagram of an exemplary storage device of the speech synthesis system of FIG. 1.

Referring now to FIG. 2, a block diagram of an exemplary one of the storage device 114 of the speech processing system 100 is illustrated. The storage device 114 may include an input interface 204, a data processing module 206, the reconstructor module 202, the deconstructor module 200, augmentations 208, and/or an output module 210, although other types and/or number of modules can also be used in other examples.

The input interface 204 may serve as an interface through which the speech processing system 100 receives input data and may allow for the input of speech and/or audio data or any other representation that captures characteristics of input speech. The input interface 204 may include various components or functionalities to facilitate the input process and may include hardware components such as microphones or audio interfaces for capturing real-time speech data. Alternatively, the input interface 204 may include a software interface that allows for the input of pre-recorded speech data or textual representations, and other types of input interfaces can also be used in other examples.

Accordingly, the input interface 204 may facilitate the receipt by the speech processing system 100 of the necessary data to initiate the style extraction and speech synthesis process described and illustrated herein. The input interface 204 may be the initial point of interaction between a user (e.g., a user computing device) or external systems and the speech processing system 100. The input data provided through the input interface 204 may serve as the foundation for subsequent processing and analysis within the speech processing system 100, as described and illustrated in detail below.

The data processing module 206 may handle the input data received from the input interface 242. The data processing module 206 may employ techniques such as signal processing, statistical analysis, or machine learning algorithms to extract meaningful information from the input data. This information may include phonetic features, linguistic characteristics, and/or other relevant parameters that contribute to the style extraction (e.g., extraction of the non-content elements 408). The processed data from the data processing module 206 may be then passed on to subsequent modules within the speech processing system 100, such as the deconstructor module 200, for example, for further analysis and transformation.

Figure 4:
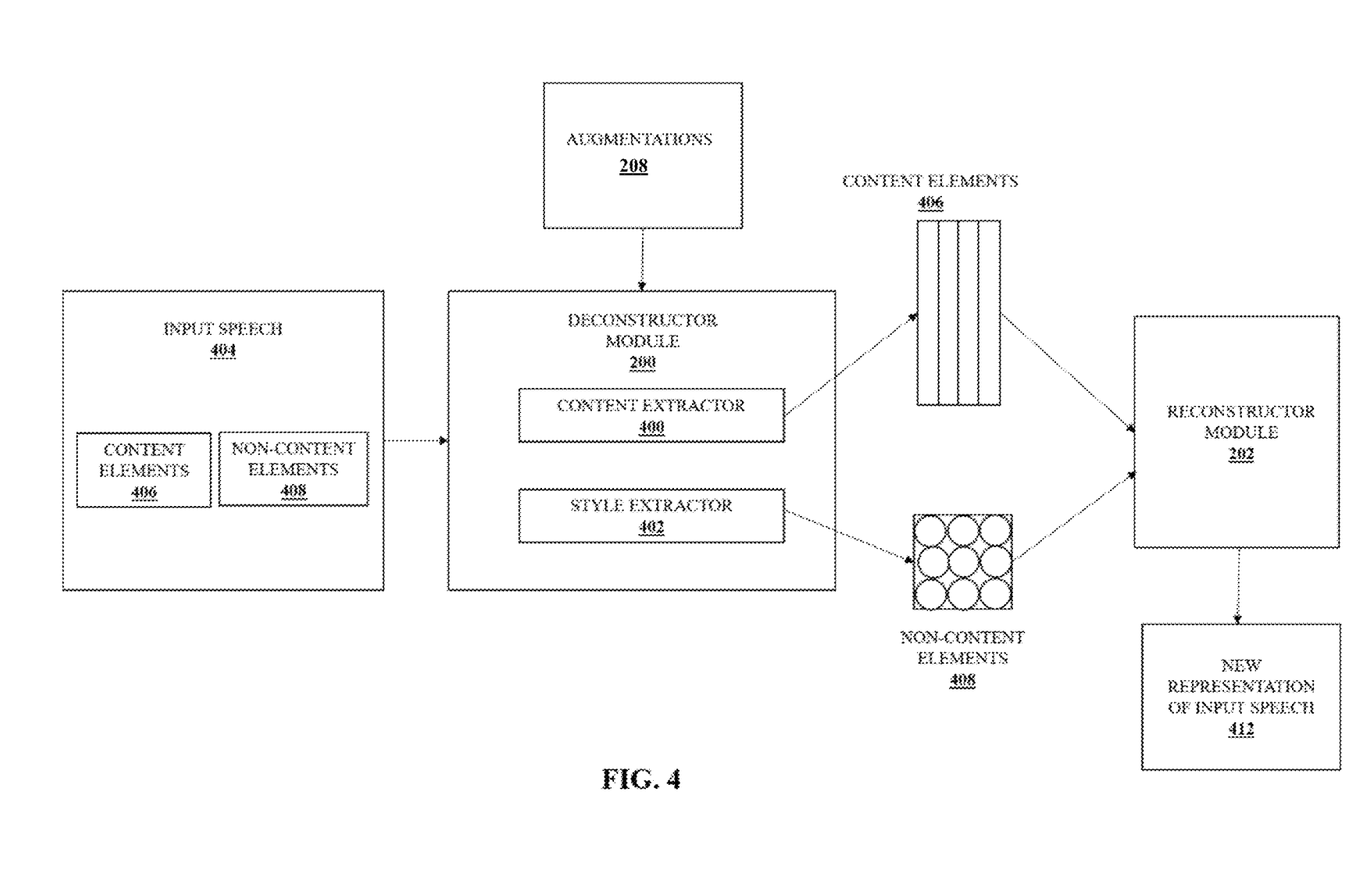
FIG. 4 is a flow diagram of an exemplary method for performing style extraction.

The deconstructor module 200 generally separates input speech 404 into content elements 406 and non-content elements 408, which include style components or elements (e.g., pitch). Thus, a deconstructor-reconstructor process may be employed with this technology to separate the input speech 404 into the content and style components. In some examples, the deconstructor module 200 includes a content extractor 400 and a neural network-based style extractor 402.

Generally, the content extractor 400 may abstract the non-content elements 408, optionally incorporating Automatic Speech Recognition (ASR)-inspired techniques, including corresponding transcripts, to guide content representation. The style extractor 402 may apply a neural network or other machine learning or artificial intelligence model to encode at least a pitch of the input speech 404 in a latent representation. The pitch encoding process may proceed without the need for explicit pitch labels in some examples, which may enhance the robustness against noise and degradation in the input speech 404. The operation of the content extractor 400 and the style extractor 402 will be described and illustrated in more detail below, including with reference to FIG. 4.

Optionally, the deconstructor module 200 utilizes the augmentations 208 to facilitate the separation of the input speech 404 into the content elements 406 and the non-content elements 408. The augmentations 208 may include making the speech fast and slower, adding a richer variety in pitch, making the existing audio track more male or female, adding more background noise to make a neural network trained as part of the deconstructor module 200 more robust (e.g., air conditioner sounds, fans, environmental sounds (e.g., from adjacent call center agents) and/or adding background noise, masked data, microphone pops, smooth speech, and/or convolving speech, for example, although other augmentations 208 can also be used in other examples. The augmentations 208 in this example are included (e.g., processed by the neural network of the style extractor 402) to simulate degraded speech characteristics.

The reconstructor module 202, generally combines the non-content elements 408 and the content elements 406 output by the deconstructor module 200 into a new representation of the input speech 412. This technology ensures that the pitch of the new representation of the input speech 412 remains the same as the input speech 404, preserving the source identity in accent translation, for example, among other downstream applications of this technology. With label-free pitch encoding and ASR-inspired content extraction, the disclosed technology advantageously enhances robustness against noise and degradation.

The output module 216 optionally facilitates adjustment of speech characteristics, such as speech rate, pitch, or gender, to further customize the new representation of the input speech 412 based on user preferences or application requirements, for example. The output module 216 may deliver a seamless and intelligible speech output that reflects the new representation of the input speech 412. For example, by leveraging the advanced speech synthesis techniques described herein, the output module 216 may provide an accurate representation of a converted accent, allowing users to hear the speech output (i.e., the new representation of the input speech 412) with an intended target accent in real-time or on-demand.

Figure 3:
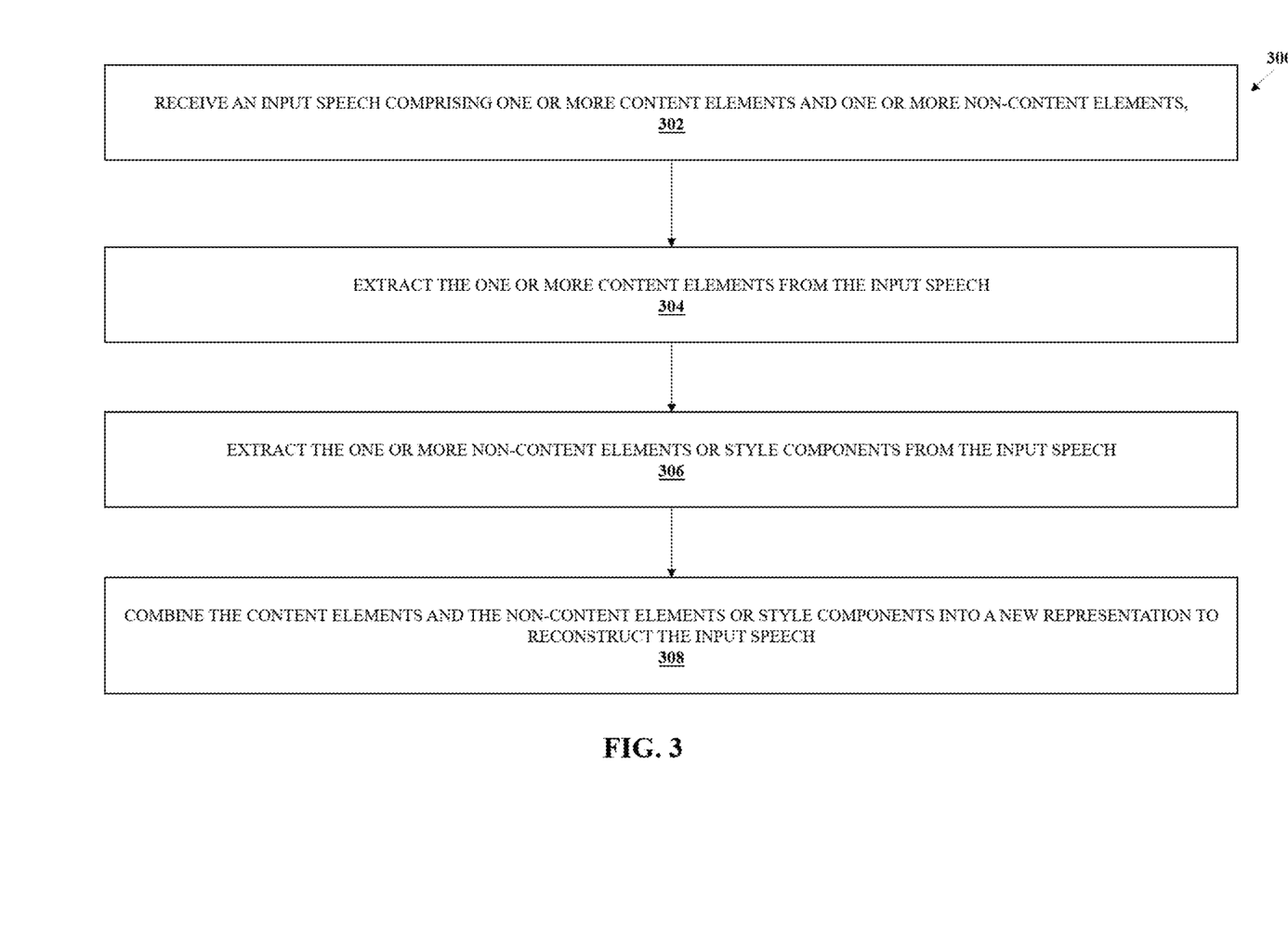
FIG. 3 is a flowchart of an exemplary method for neural network-based style extraction in speech synthesis.

Referring now to FIG. 3, a flowchart of an exemplary method 300 for neural network-based style extraction in speech synthesis is illustrated. In some examples, the method 300 may be implemented as a software application (e.g., software 116 executed by the central processing unit 102) or a module within a larger system. The software application or module may receive input audio data, perform style extraction and speech synthesis, and provide an output speech in real-time, as explained in detail below In step 302 in some examples, the speech processing system 100 receives (e.g., by the deconstructor module 200), input speech 404 comprising one or more content elements 406 and one or more non-content elements 408, which are also referred to herein as style elements or style components (e.g., pitch). The input speech 404 can be communicated to the deconstructor module 200 by the input interface 204, for example.

In step 304, the speech processing system 100 extracts (e.g., by the content extractor 400) content elements 406 from the input speech 404. In some examples, the content extractor 400 utilizes ASR-inspired techniques for improved content representation, incorporating corresponding transcripts to guide content extraction.

In step 306, the speech processing system 100 extracts (e.g., by the neural network-based style extractor 402) non-content elements 408 including style elements (e.g., pitch (i.e., the perceived frequency of the sound such as how high or low the voice is), timber (i.e., the quality of the sound of the voice), prosody (i.e., the rhythm, stress, and intonation of the speech), speed (i.e., the rate of the speech), volume (i.e., the loudness or softness of the voice), speaker identity (i.e., characteristics that uniquely identify the speaker (e.g., accent or unique vocal traits)), or any other audio unrelated to the actual content of what is being said) from the input speech 404. In one example, this technology provides a method for preserving source identity in accent translation through explicit encoding of pitch information using the style extractor 402 to ensure that the pitch of the output speech (e.g., the new representation of input speech 412) remains consistent with that of the input speech 404 while maintaining robustness against noise and degradation. Thus, the style extractor 402 can be part of a style encoder in some examples in which a style encoder extracts the non-content or style elements from the input and compresses them into a latent representation and the style extractor 402 functions within the style encoder to identify and isolate these non-content or style elements.

Thus, the dedicated style extractor 402 may be employed to encode the pitch of the input speech 404 in a latent representation. This encoding process may be designed to represent the pitch information in a compressed form, utilizing only two numbers per frame, although other types of encoding or compressed forms with other numbers per frame can also be used in other examples.

In some examples, the style elements of the non-content elements 408 may be represented as a low-dimensional vector for efficient encoding of style information only, excluding the content elements 406. The low-dimensional vector space may serve as a bottleneck, emphasizing the extraction and encoding of style-related features. In some examples, the low-dimensional vector space bottleneck minimizes the encoding of content-related details (e.g., the content elements 406) in the style representation, focusing on the efficient encoding of pitch information. In some examples, the low-dimensional vector space bottleneck has a predefined dimensionality to efficiently encode pitch information and minimize computational complexity during the deconstruction-reconstruction process.

In step 308, the speech processing system 100 combines (e.g., by the reconstructor module 202) the content elements 406 and the style components of the non-content elements 408 into a new representation of the input speech 412 to reconstruct the input speech 404. In some examples, the speech processing system 100 performs an autoencoding reconstruction process that leverages the style extractor 402 to learn and encode style information in a low-dimensional vector space, which ensures that the style representation is distinct from the content elements 406, promoting effective style extraction without compromising content details.

Thus, in these examples, the neural network-based style extractor 402 can be trained following an autoencoding reconstruction process. The style extractor 402 can extract a style representation of the audio input during the reconstruction process, using accent-free speaker data. In another example, both the content representation (e.g., the content elements 406 output by the content extractor 400) and the style representation (e.g., the non-content elements 408 output by the style extractor 402) may be taken as input to the reconstructor module 202 for pitch-consistent reconstruction of the original audio (e.g., the input speech 404). The style extractor 402, being untrained initially, may learn to encode style information during the autoencoding reconstruction process.

In another example, the style extractor 402 is trained to extract pitch information (e.g., of the non-content elements 408) in a low-dimensional representation without explicit pitch labels, enhancing robustness against noise and degradation. In yet another example, the deconstruction-reconstruction framework utilizes a neural network-based approach for both content (e.g., content elements 406) and style (e.g., non-content elements 408) separation.

Referring to FIG. 4, a flow diagram of an exemplary method for performing style extraction is illustrated. In this example, the input speech 404 includes content elements 406 and non-content elements 408 and may be received by the deconstructor module 200. The content extractor 400 of the deconstructor module 200 may extract the content elements 406 from the input speech 404. The neural network-based style extractor 402 of the deconstructor module 200 may extract the non-content elements 408 from the input speech 404, including style elements. The reconstructor module 202 may then combine the non-content elements 408 and content elements 406 into a new representation of the input speech 412.

Figure 5:
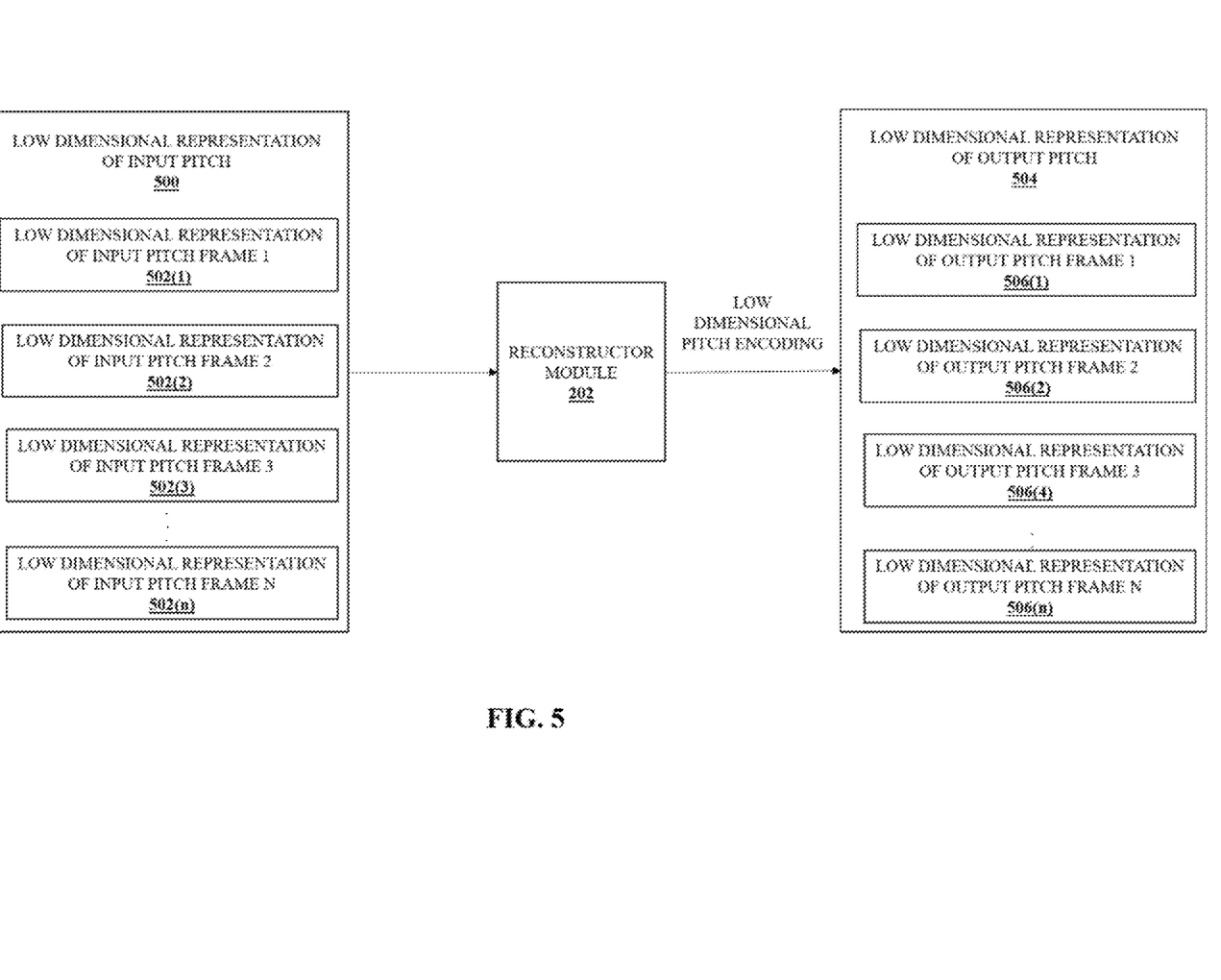
FIG. 5 is a flow diagram of an exemplary method for converting a low-dimensional representation of input pitch to a low-dimensional representation of output pitch.

Referring now to FIG. 5, a flow diagram of an exemplary method for converting a low-dimensional representation of input pitch 500 to a low-dimensional representation of output pitch 504 is illustrated. In this example, the reconstructor module 202 uses low dimensional pitch encoding to convert the low-dimensional representation of input pitch 500 to the low-dimensional representation of output pitch 504. The low-dimensional representation of input pitch 500 may include multiple low dimensional representations of input speech frames 502(1)-(n).

In some examples, the conversion illustrated in FIG. 5 includes generating an input mel-spectrogram from the input speech audio, which is a visual representation of the spectrum of frequencies in a sound signal as it varies with time. The input mel-spectrogram is then passed through a pitch encoder, which extracts and compresses the pitch information into a compressed, low-dimensional representation. Accordingly, this low-dimensional representation captures the essential pitch information from the original, input mel-spectrogram. The low-dimensional representation is then fed into a pitch decoder, which reconstructs a mel-spectrogram from the low-dimensional representation of pitch information. The output of the pitch decoder is a reconstructed mel-spectrogram that is as close as possible to the input mel-spectrogram. In some examples, this encoding/decoding is performed with a neural network trained to compress and reconstruct data, although other types of auto-encoding can also be used in other examples.

Unlike traditional methods, explicit pitch labels are advantageously not required with this technology, contributing to enhanced robustness against noise and degradation in the input speech 404. In some examples, the extracted pitch information is provided as a separate representation for downstream audio processing applications, including pitch-specific synthesis and modification. For example, pitch-consistent accent translation can be applied to generate enhanced or modified audio output (e.g., the new representation of the input speech 412), preserving the pitch characteristics of the original input speech 404.

In this example, the encoded pitch information may be seamlessly reintegrated into the prediction process of an accent translation network, for example.

During accent translation in such examples, the pitch information encoded by the style extractor 402 may guide the synthesis of the translated speech, ensuring that the pitch of the output (e.g., aligns with the source identity of the input speech 404. In these examples, the style extractor 402 can learn to encode style information (e.g., of the non-content elements 408), specifically pitch, in the autoencoding reconstruction process, contributing to the pitch-consistent accent translation. Accordingly, in some examples, the accent translation process facilitates the adaptation of the style of the input speech 404 audio content while advantageously maintaining pitch consistency.

Having thus described the basic concept of the invention, it will be rather apparent to those skilled in the art that the foregoing detailed disclosure is intended to be presented by way of example only and is not limiting. Various alterations, improvements, and modifications will occur and are intended for those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, therefore, is not intended to limit the claimed processes to any order.

What is claimed is:

1. A speech processing system, comprising an audio interface, memory having instructions stored thereon, and one or more processors coupled to the memory and the audio interface and configured to execute the instructions to:
   extract, from input audio data obtained via the audio interface and corresponding to input speech, one or more content elements and one or more non-content elements comprising using stored augmentations to facilitate separation of the input speech into the one or more content elements and the one or more non-content elements, wherein the one or more non-content elements comprise style elements comprising at least an input pitch and the stored augmentations simulate degraded speech characteristics and comprise one or more of background noise, air conditioner sounds, fan sounds, environmental sounds, masked data, microphone pops, smooth speech, or convolving speech;
   apply a trained autoencoder to encode the input pitch extracted from the input audio data in a latent representation comprising a low-dimensional vector, wherein the latent representation excludes the one or more content elements and the excluded one or more content elements comprise audio related to the content of what is being said by a speaker of the input speech including phonemes;
   combine the one or more content elements and the one or more non-content elements based on the low-dimensional vector to generate a new representation of the input speech; and
   generate and provide output audio data based on the new representation of the input speech, wherein the output audio data comprises a pitch-consistent reconstruction of the input speech.

2. The speech processing system of claim 1, wherein the input audio data comprises a plurality of frames and the one or more processors are further configured to execute the instructions to convert the low-dimensional vector to a low-dimensional representation of an output pitch on a frame-by-frame basis in accordance with the plurality of frames of the input audio data.

3. The speech processing system of claim 2, wherein the one or more processors are further configured to execute the instructions to apply the trained autoencoder to combine the one or more content elements and the one or more non-content elements further based on the low-dimensional representation of the output pitch.

4. The speech processing system of claim 1, wherein the one or more processors are further configured to execute the instructions to apply one or more automated speech recognition techniques to extract the one or more content elements.

5. The speech processing system of claim 1, wherein the one or more processors are further configured to execute the instructions to train the autoencoder using accent-free speaker data.

6. The speech processing system of claim 1, wherein the one or more processors are further configured to execute the instructions to apply an autoencoding deconstruction-reconstruction technique to the one or more content elements before generating the output audio data.

7. A method for style extraction in speech synthesis, the method implemented by a speech processing system and comprising:
    extracting, from input audio data corresponding to input speech, one or more content elements and one or more non-content elements comprising using stored augmentations to facilitate separation of the input speech into the one or more content elements and the one or more non-content elements, wherein the one or more non-content elements comprise at least an input pitch and the stored augmentations simulate degraded speech characteristics and comprise one or more of background noise, air conditioner sounds, fan sounds, environmental sounds, masked data, microphone pops, smooth speech, or convolving speech;
    applying a neural network to encode the input pitch extracted from the input audio data without the one or more content elements in a low-dimensional vector, wherein the excluded one or more content elements comprise audio related to the content of what is being said by a speaker of the input speech including phonemes;
    combining the one or more content elements and the one or more non-content elements based on the low-dimensional vector to generate a new representation of the input speech; and
    providing output audio data generated based on the new representation of the input speech, wherein the output audio data comprises a pitch-consistent reconstruction of the input speech.

8. The method of claim 7, further comprising applying an autoencoding deconstruction-reconstruction technique to the one or more content elements before generating the output audio data.

9. The non-transitory computer-readable medium of claim 8, wherein the latent representation comprises a low-dimensional vector and represents the input pitch in a compressed form.

10. The non-transitory computer-readable medium of claim 8, wherein the input audio data comprises a plurality of frames and the instructions, when executed by the at least one processor further cause the at least one processor to:
    convert the latent representation to a low-dimensional representation of an output pitch on a frame-by-frame basis in accordance with the plurality of frames of the input audio data; and
    apply the neural network to combine the one or more content elements and the one or more non-content elements further based on the low-dimensional representation of the output pitch.

11. The non-transitory computer-readable medium of claim 8, wherein the instructions, when executed by the at least one processor further cause the at least one processor to apply one or more automated speech recognition techniques to extract the one or more content elements.

12. The non-transitory computer-readable medium of claim 8, wherein the instructions, when executed by the at least one processor further cause the at least one processor to train the neural network using accent-free speaker data.

13. The non-transitory computer-readable medium of claim 8, wherein the instructions, when executed by the at least one processor further cause the at least one processor to apply an autoencoding deconstruction-reconstruction technique to the one or more content elements before generating the output audio data.

14. The method of claim 7, wherein the input audio data comprises a plurality of frames and the method further comprises converting the low-dimensional vector to a low-dimensional representation of an output pitch on a frame-by-frame basis in accordance with the plurality of frames of the input audio data.

15. The method of claim 14, further comprising applying the neural network to combine the one or more content elements and the one or more non-content elements further based on the low-dimensional representation of the output pitch.

16. The method of claim 7, further comprising applying one or more automated speech recognition techniques to extract the one or more content elements.

17. The method of claim 7, further comprising training the neural network using accent-free speaker data.

18. A non-transitory computer-readable medium comprising instructions that, when executed by at least one processor, cause the at least one processor to:
    extract, from input audio data corresponding to input speech, one or more content elements and one or more non-content elements comprising using stored augmentations to facilitate separation of the input speech into the one or more content elements and the one or more non-content elements, wherein the one or more non-content elements comprise at least an input pitch and the stored augmentations simulate degraded speech characteristics and comprise one or more of background noise, air conditioner sounds, fan sounds, environmental sounds, masked data, microphone pops, smooth speech, or convolving speech;
    apply a neural network to encode the input pitch extracted from the input audio data in a latent representation, wherein the latent representation excludes the one or more content elements and the excluded one or more content elements comprise audio related to the content of what is being said by a speaker of the input speech including phonemes;
    combine the one or more content elements and the one or more non-content elements based on the latent representation to generate a new representation of the input speech; and provide output audio data generated based on the new representation of the input speech, wherein the output audio data preserves one or more pitch characteristics of the input speech.

* * * * *